（12） United States Patent
Engler et al.

(10) Patent No.: US 10,546,147 B1
(45) Date of Patent: Jan. 28, 2020

(54) UNCERTAIN FILE SYSTEM

(71) Applicant: Rockwell Collins, Inc., Cedar Rapids, IA (US)

(72) Inventors: Joseph J. Engler, Monticello, IA (US); Aaron M. Meis, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 174 days.

(21) Appl. No.: 15/659,589

(22) Filed: Jul. 25, 2017

(51) Int. Cl.
*G06F 12/02* (2006.01)
*G06F 21/62* (2013.01)
*G06F 16/17* (2019.01)

(52) U.S. Cl.
CPC .......... *G06F 21/6218* (2013.01); *G06F 16/17* (2019.01)

(58) Field of Classification Search
CPC .............................. G06F 21/6218; G06F 16/17
USPC ............................................................. 726/1
See application file for complete search history.

(56) References Cited

U.S. PATENT DOCUMENTS

| | | | |
|---|---|---|---|
| 9,135,116 B1* | 9/2015 | Balasubramanian ... | G06F 16/13 |
| 2003/0118185 A1* | 6/2003 | Lambert ................. | H04L 9/001 380/263 |
| 2005/0273858 A1* | 12/2005 | Zadok .................... | G06F 21/50 726/24 |
| 2011/0296133 A1* | 12/2011 | Flynn ................... | G06F 11/1048 711/171 |

\* cited by examiner

*Primary Examiner* — Jeffrey C Pwu
*Assistant Examiner* — Nega Woldemariam
(74) *Attorney, Agent, or Firm* — Suiter Swantz pc llo

(57) ABSTRACT

A file system stores files in a location base on deterministic nonlinear functions using certain initial conditions of the files creation. The file is chunked and encrypted according to one of a set of encryption algorithms based on the initial conditions. Only the file name and associated initial conditions are stored; the initial location and encryption algorithm are not stored and therefore not retrievable. The file system periodically relocates the files based on one of a set of algorithms based on the initial conditions such that even if the initial location where know, the file would still be irretrievable without knowing the relation between the initial conditions and relocation algorithm. During retrieval, the system uses the stored initial conditions to identify the initial location, relocation algorithm, and encryption algorithm.

20 Claims, 4 Drawing Sheets

UNCERTAIN FILE SYSTEM

BACKGROUND

Current file systems are inherently vulnerable to cyber-attack due to their static structure. Advanced Persistent Threats ("APT") currently result in the expenditure of hundreds of millions of dollars for preventative solutions. Monitoring and intrusion detection/prevention systems are often incapable of handling new and changing threats and are often list based.

Consequently, it would be advantageous if an apparatus existed that is suitable for implementing a file system that is inherently resistant to security breaches.

SUMMARY

In one aspect, embodiments of the inventive concepts disclosed herein are directed to a file system that stores files in a location base on deterministic nonlinear functions using certain initial conditions of the files creation. The file is also chunked and encrypted according to one of a set of encryption algorithms based on the initial conditions. Only the file name and associated initial conditions are stored; the initial location and encryption algorithm are not stored and therefore not retrievable. During retrieval, the system uses the stored initial conditions to identify the initial location and encryption algorithm.

In a further aspect, the file system periodically relocates the files based on one of a set of functions and the initial conditions such that even if the initial location where know, the file would still be irretrievable without knowing the relation between the initial conditions and relocation functions.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
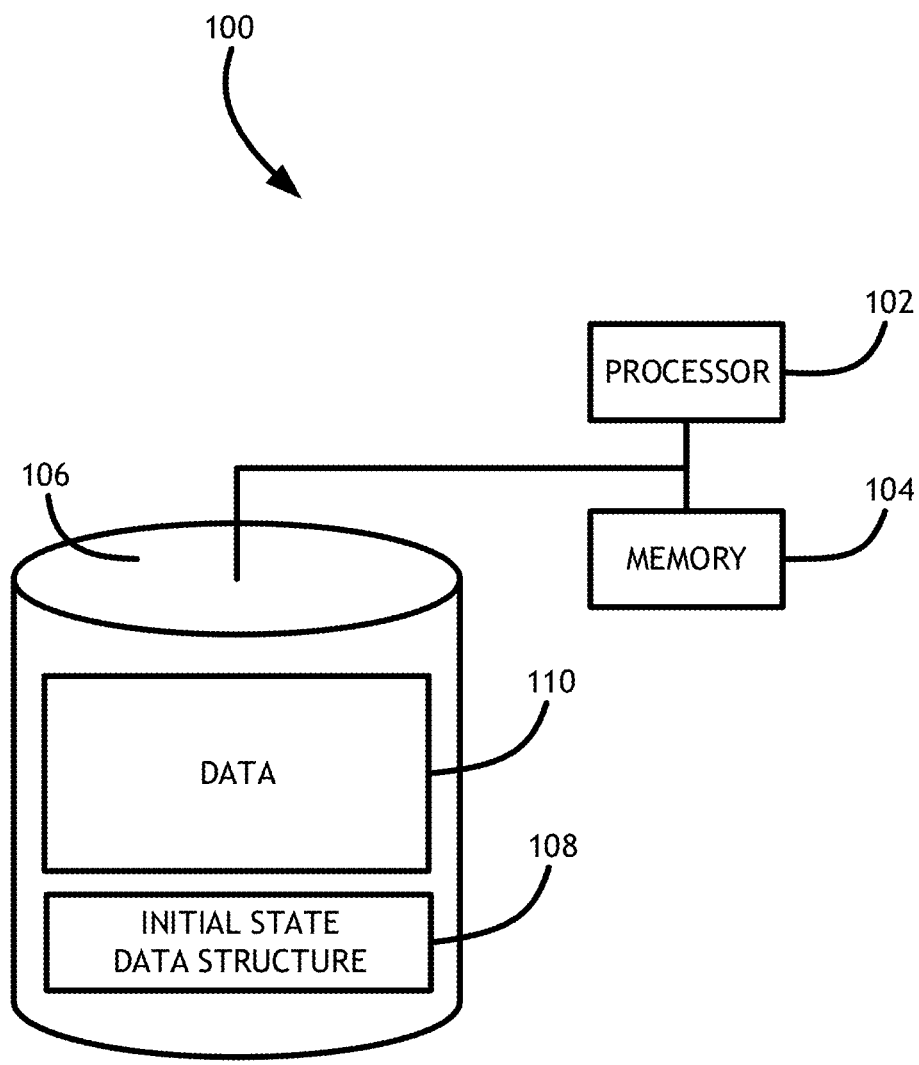
FIG. 1 shows an exemplary embodiment of a computer system for implementing inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a file system that stores files in a location base on deterministic nonlinear equations using certain initial conditions of the files creation. The file is also chunked and encrypted according to one of a set of encryption algorithms based on the initial conditions. Only the file name and associated initial conditions are stored; the initial location and encryption algorithm are not stored and therefore not retrievable. During retrieval, the system uses the stored initial conditions to identify the initial location and encryption algorithm.

Referring to FIG. 1, an exemplary embodiment of a computer system 100 for implementing inventive concepts disclosed herein is shown. The system 100 includes a processor 102, memory 104 connected to the processor 102 for storing processor executable code, and a data storage element 106 connected to the processor 102. When creating a file, the processor 102 identifies certain initial conditions of the file and stores the initial conditions, file name, and potentially other metadata about the file in an initial state data structure 108. The initial state data structure 108 may comprise a tensor hash table for quickly retrieving files by file name, though other data structures are envisioned. Furthermore, the initial state data structure 108 may be stored within the data storage element 106, or separate from the data storage element 106 in a secondary storage system in data communication with the processor 102. In at least one embodiment, the initial conditions comprise the time stamp of the time of creation. In at least one embodiment, the initial conditions comprise random or pseudo-random elements assigned by the processor 102. In at least one embodiment, the initial conditions comprise components associated with the creating user.

Based on at least one initial condition, the processor 102 identifies an initial file location within a file storage structure 110 in the data storage element 106. In at least one embodiment, the initial file location may comprise a folder identifier in an otherwise traditional file system, where each possible initial condition deterministically resolves to a single folder, either directly or via one or more functions as more fully described herein. In at least one embodiment, file locations may be defined by a numeric folder key within the system's 100 folder structure. Using decimal precision (28 digit) $10^{28}$ folders can be utilized by the system 100, each of which appears to the external viewer as having equal probability of a portion of the file being stored in it.

In at least one embodiment, the initial file location may comprise a starting memory address, where each possible initial condition deterministically resolves to a memory address, either directly or via one or more functions.

In at least one embodiment, the processor 102 divides the file into equally sized or substantially equally sized components, and each component is encrypted. Dividing files into encrypted components prevents encrypted files from being found and tracked, and thereby reverse engineering the deterministic nonlinear equations of the system. In at least one embodiment, the encryption algorithm may be selected from a set of possible encryption algorithms based on the initial conditions, where each possible initial condition deterministically resolves to a single encryption algorithm.

After files are created and stored, the file components may be periodically moved according to one or more functions associated with the initial conditions. In at least one embodiment, the processor 102 tracks intervals via clock cycles and moves the files to a new deterministic location based on the passage of a predetermined number of intervals.

When retrieving a file, the processor 102 references the initial state data structure 108 to retrieve the initial conditions associated with the file name. Based on the initial conditions, the processor 102 identifies an encryption algorithm used to encrypt the file (and thereby an algorithm to decrypt the file) and an initial storage location of the file within the file storage structure 110 by applying the initial conditions to the appropriate deterministic system of chaotic functions. Chaotic systems produce data that tends to a finite region of phase space (multidimensional space of a system) while never producing repeating values. To date only approximations of a chaotic system can be produced from the raw data of the system and these approximations rapidly break down due to a principal of chaos science known as Sensitive Dependence on Initial Conditions. This means that it is impossible to exactly recreate the chaotic system without absolute knowledge of the exact initial conditions of the system.

Where the system 100 periodically relocates the file, the processor 102 may determine the number of intervals that have passes since the initial storage and calculate the current location via the deterministic system of chaotic functions associated with initial conditions.

In at least one embodiment, where the initial state data structure 106 is stored separately from the file storage structure 110, outside the data storage element 106, the files may remain secure even after physically removing or copying the file storage structure 110 or data storage element 106. In such instance, even having all of the necessary algorithms and functions, the files would be irretrievable without the exact initial conditions associated with each file.

In a multi-core processor 102, or a system 100 with multiple independent processors 102, one core or one independent processor 102 may be allocated for periodic file maintenance as described herein.

In at least one embodiment, the system 100 may be incorporated into a communication device for aircraft to ground communication. In at least one embodiment, the data storage element 106 may comprise a database within file storage system.

Figure 2:
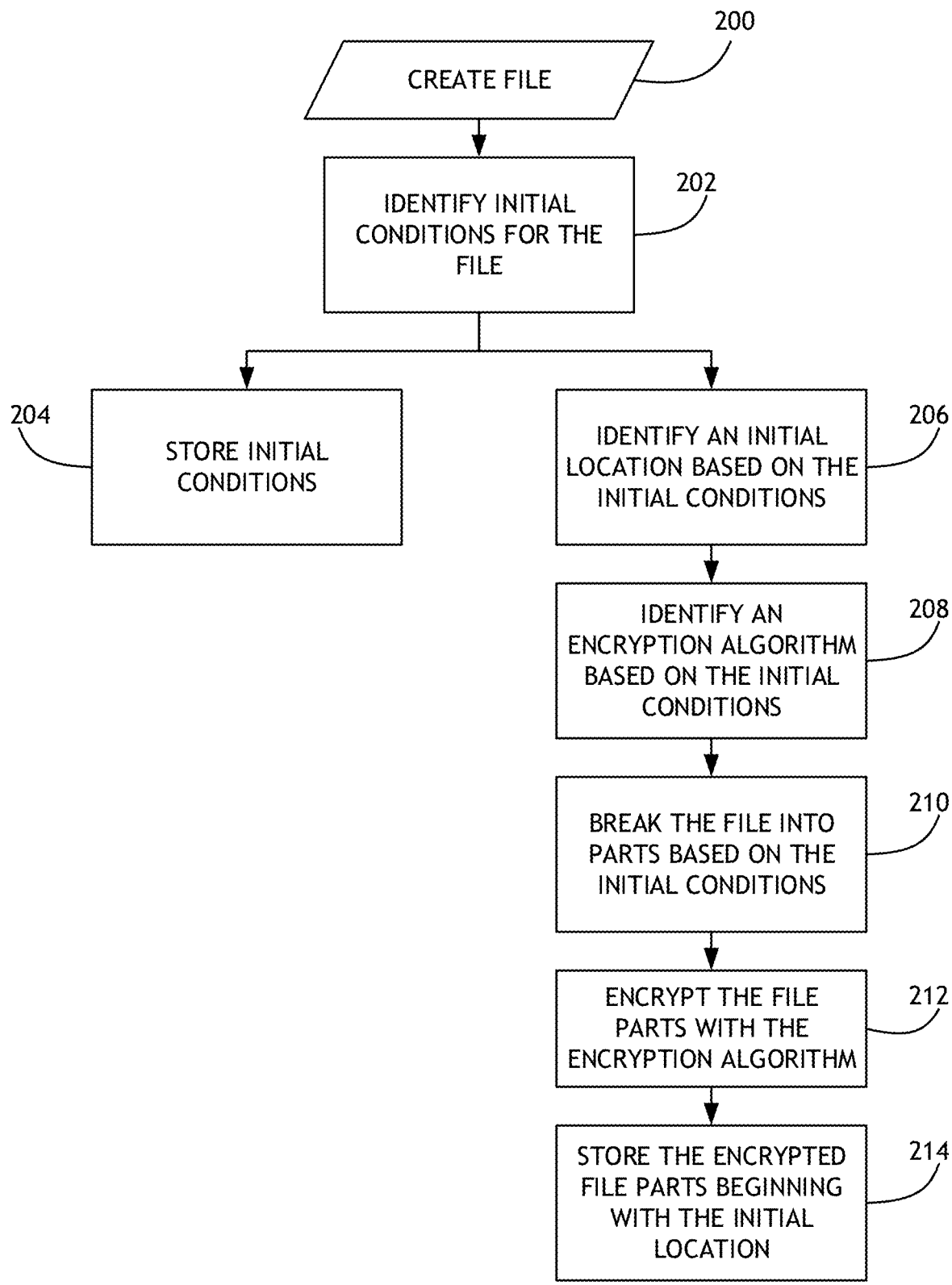
FIG. 2 shows a flowchart of a method for storing files securely according to the inventive concepts disclosed herein.

Referring to FIG. 2, a flowchart of a method for storing files securely according to the inventive concepts disclosed herein is shown. When a file is created 200, a set of initial conditions for the file are identified 202. he initial conditions may comprise a time stamp, random or pseudo-random numbers, identifying information associated with the creator of the file, or any other quantity that may be associated with the file and used to provide input to a deterministic system of chaotic functions. The initial conditions are stored 204 along with the file name and/or other identifiers. In at least one embodiment, storing 204 the file name and initial conditions may comprise storing a virtual file location. Such virtual file location may correspond to a traditional file location supplied by a user, for reference by the user, but having no relation to an actual location within the data storage element 206.

An initial location for the file is identified 206 within a file structure based on the initial conditions and a deterministic system of chaotic functions where each potential output of the deterministic system of chaotic functions corresponds to a file location. In one exemplary embodiment, the deterministic system of chaotic functions comprises a Lorentz attractor, where the inputs to the system of differential equations comprise some subset of the initial conditions, and the parameter values are selected from a predetermined set of possible parameter values based on the initial conditions. In such exemplary embodiment, the system of differential equations may comprise:

$$\dot{x} = \sigma(y-x)$$

$$\dot{y} = rx - y - xz$$

$$\dot{z} = xy - bz$$

where σ, r, and b comprise a predetermined set of parameters, x, y, and z comprise inputs defined by the initial conditions, and $\dot{x}$, $\dot{y}$, and $\dot{z}$ define an initial file location. In at least one embodiment, $\dot{x}$, $\dot{y}$, and $\dot{z}$ define a folder identifier. A Lorenz attractor is a system of deterministic functions, but chaotic in nature.

In at least one embodiment, the initial conditions may identify 208 an encryption algorithm in a set of possible encryption algorithms. Each initial condition may be associated with the corresponding encryption algorithm via a system of chaotic functions. The file is then broken 210, chunked, or otherwise segmented into substantially similarly sized components and encrypted 212 via the identified encryption algorithm. The encrypted file or encrypted components of the file are then stored 214 at the initial file location or across the system in multiple changing file locations based upon the evolution of a chaotic system as more fully described herein.

Figure 3:
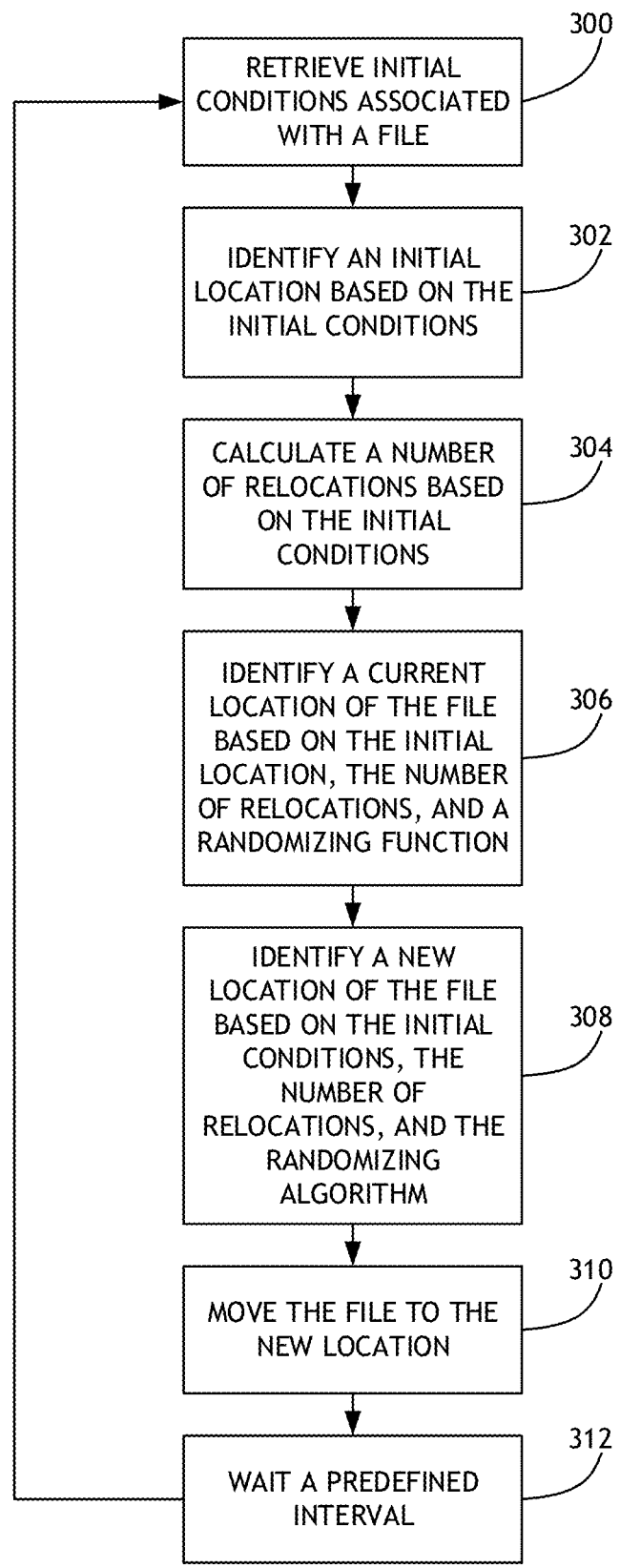
FIG. 3 shows a flowchart of a method for maintaining files securely according to the inventive concepts disclosed herein.

Referring to FIG. 3, a flowchart of a method for maintaining files securely according to the inventive concepts disclosed herein is shown. In at least one embodiment, files are periodically relocated within the file storage structure. Initial conditions associated with a file are retrieved 300. The initial conditions identify 302 an initial location. Based on the initial conditions and a number of relocation periods since the file's creation, a current location of the file can be identified 306. The number of relocation periods is calculated 304 based on the duration since the file was created. In at least one embodiment, every relocation period the files are moved to another location based upon the deterministic evolution of the selected chaotic system.

In at least one embodiment, relocation periods may be five to ten seconds. Further, files may be divided into relocation sets based on the initial conditions such that not all files are relocated during every relocation period. For example, where the initial conditions include an element that defines five relocation sets, only one fifth of all the files are relocated during every relocation period to balance the load of file relocation. In addition, the relocation period may be reduced as the load during individual relocation periods is reduced.

The initial conditions may also define inputs for a deterministic system of chaotic functions that identifies 308 a new location for the file based on the number of relocation periods. Alternatively, the same system that defined the initial file location may define a new file location with the additional input of a number of relocation periods. Once the new location is identified 308 the file is moved 310 (which in some file systems requires only a modification to a file allocation table) and the system waits 312 a predetermined length of time as defined by the relocation period to start the process again.

Utilizing such methods, an external attacker attempting to exfiltrate data will have no ability to determine or predict where the file is or will be at any given point in time.

Figure 4:
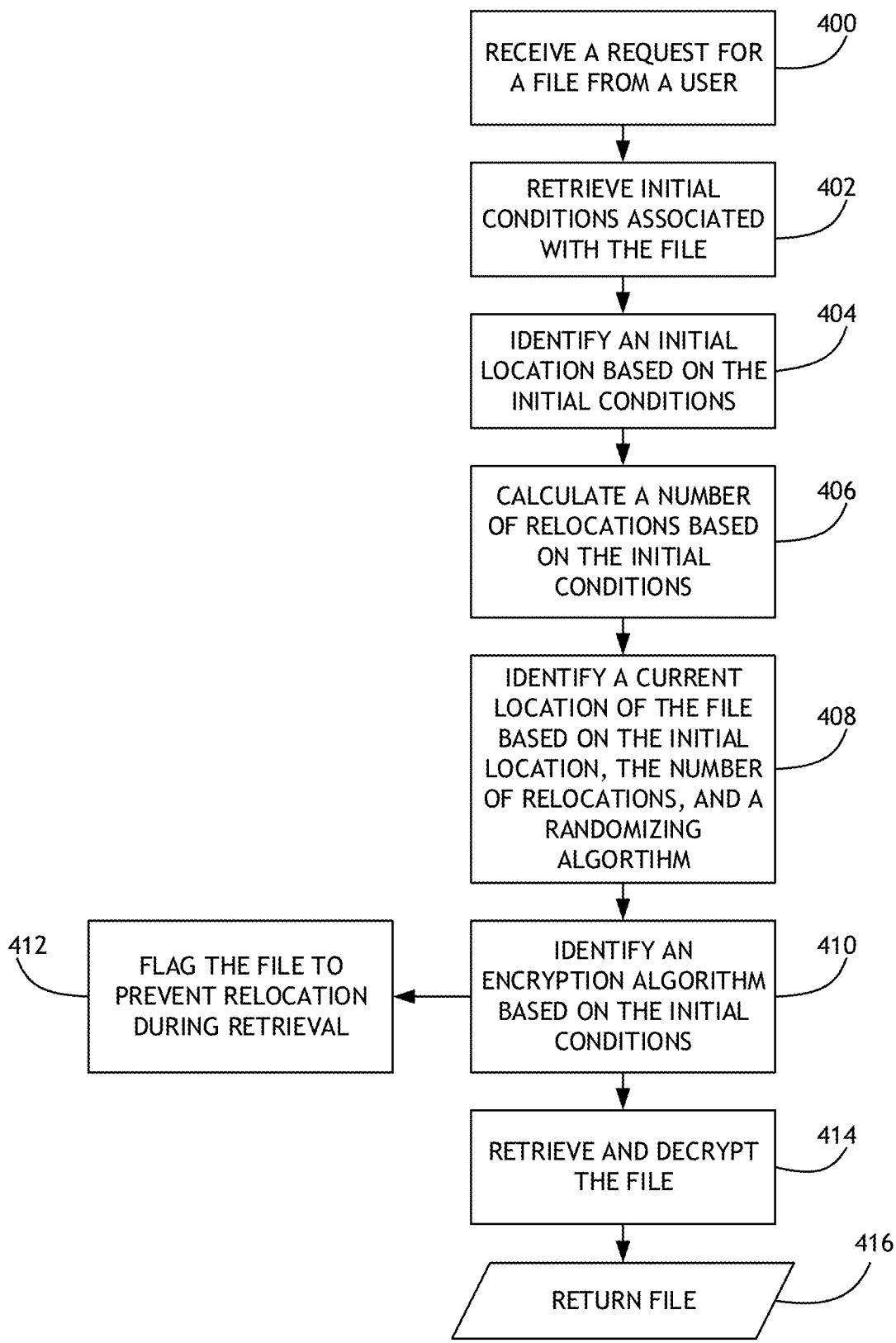
FIG. 4 shows a flowchart of a method for retrieving files from a secure storage system according to the inventive concepts disclosed herein.

Referring to FIG. 4, a flowchart of a method for retrieving files from a secure storage system according to the inventive concepts disclosed herein is shown. A request from a user to retrieve the file is received 400. A processor managing the secure storage system retrieves 402 the initial conditions associated with the file and identifies 404 the initial location based on those initial condition.

Where the system periodically relocates files, the processor calculates 406 the number of relocation periods based on the initial conditions and the duration since the file was created. The processor then identifies 408 the current location of the file based on the initial conditions and number of relocation periods. An encryption algorithm (and therefore decryption algorithm) is identified 410 based on the initial conditions and the file is decrypted 414 and returned 416 to the user.

In at least one embodiment, the processor may flag 412 the file to prevent relocation during retrieval.

In one exemplary embodiment, given a selection of twenty-four sets of chaotic functions, a chaotic system of functions is chosen based on the hour of file creation. Initial system parameters for the system of chaotic functions are chosen from a list of sixty possible sets of parameters based upon the minute of file creation. A starting folder iteration (iterations of the system before assigning the initial folder) is selected based on the second of file creation. In such embodiment, there would be 86,400 possible initial configurations.

To break the system, an attacker would have a 1 in $8.64*10^{32}$ chance of finding a single portion of the file. On top of the chaotic system for moving the file, a 256 bit encryption may be applied to each file using a separate system of chaotic functions for generating the encryption keys.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one processor in data communication with a memory storing processor executable code; and
   a data storage element in data communication with the at least one processor,
   wherein the processor executable code configures the at least one processor to:
   create a file;
   identify a set of initial conditions associated with the file;
   store the initial conditions, associated with a file identifier, in a data structure in the data storage element;
   determine an initial file location in the data storage element based on the set of initial conditions via a system of differential equations of the form:

$\dot{x}=\sigma(y-x)$ $\dot{y}>=rx-y-xz$ $\dot{z}=xy-bz$ wherein α, r, and b each correspond to predefined coefficients, x, y, and z each correspond to one of the initial conditions, and $\dot{x}$, $\dot{y}$, and $\dot{z}$ define an initial file location;
   determine an encryption algorithm based on the set of initial conditions;
   encrypt the file via the encryption algorithm; and
   store the encrypted file at the initial file location.

2. The computer apparatus of claim 1, wherein the processor executable code further configures the processor to:
   periodically determine a new location for the encrypted file; and
   move the encrypted file to the new location.

3. The computer apparatus of claim 1, wherein the processor executable code further configures the processor to convert the encrypted file into substantially equally sized components.

4. The computer apparatus of claim 3, wherein the substantially equally sized components are stored non-contiguously based on a deterministic set of chaotic functions with the initial conditions as inputs.

5. The computer apparatus of claim 1, wherein the initial file location is determined by a deterministic set of chaotic functions with the initial conditions as inputs.

6. The computer apparatus of claim 5, wherein the set of chaotic functions is a Lorenz Attractor.

7. The computer apparatus of claim 1, wherein the initial conditions comprise a time stamp associated with a time of creation of the file.

8. The computer apparatus of claim 1, wherein the processor executable code further configures the processor to:
receive a request to retrieve the file;
retrieve the initial conditions associated with the file;
identify the initial location of the file based on the initial conditions and a deterministic set of chaotic functions;
determine the encryption algorithm based on the set of initial conditions; and
retrieve and decrypt the file.

9. A method for securely storing data in a file system comprising:
creating a file;
identifying a set of initial conditions associated with the file;
storing the initial conditions, associated with a file identifier, in a data structure in the data storage element;
determining an initial file location in the data storage element based on the set of initial conditions via a system of differential equations of the form:

$$\dot{x}=\sigma(y-x)$$

$$\dot{y}=rx-y-xz$$

$$\dot{z}=xy-bz$$

wherein σ, r, and b each correspond to predefined coefficients, x, y, and z each correspond to one of the initial conditions, and $\dot{x}$, $\dot{y}$, and $\dot{z}$ define an initial file location;
determining an encryption algorithm based on the set of initial conditions;
encrypting the file via the encryption algorithm; and
storing the encrypted file at the initial file location.

10. The method of claim 9, further comprising:
periodically determining a new location for the encrypted file; and
moving the encrypted file to the new location.

11. The method of claim 9, further comprising converting the encrypted file into substantially equally sized components.

12. The method of claim 11, wherein the substantially equally sized components are stored non-contiguously based on a deterministic set of chaotic functions with the initial conditions as inputs.

13. The method of claim 9, wherein the initial file location is determined by a deterministic set of chaotic functions with the initial conditions as inputs.

14. The method of claim 13, wherein the set of chaotic functions is a Lorenz Attractor.

15. The method of claim 9, wherein the initial conditions comprise a time stamp associated with a time of creation of the file.

16. The method of claim 9, further comprising:
receiving a request to retrieve the file;
retrieving the initial conditions associated with the file;
identifying the initial location of the file based on the initial conditions and a deterministic set of chaotic functions;
determining the encryption algorithm based on the set of initial conditions; and
retrieving and decrypt the file.

17. A method for securely maintaining data in a file system comprising:
creating a file;
identifying a set of initial conditions associated with the file base on the time stamp of file creation;
storing the initial conditions, associated with a file identifier, in a data structure in the data storage element;
determining an initial file location in the data storage element via a deterministic set of chaotic functions with the initial conditions as inputs;
the deterministic set of chaotic functions comprising a system of differential equations of the form:

$$\dot{x}=\sigma(y-x)$$

$$\dot{y}=rx-y-xz$$

$$\dot{z}=xy-bz$$

wherein σ, r, and b each correspond to predefined coefficients, x, y, and z each correspond to one of the initial conditions, and $\dot{x}$, $\dot{y}$, and $\dot{z}$ define an initial file location;
determining an encryption algorithm based on the set of initial conditions;
encrypting the file via the encryption algorithm;
converting the encrypted file into substantially equally sized components;
storing the encrypted file components beginning at the initial file location;
periodically determining a new location for the encrypted file components; and
moving the encrypted file components to the new location.

18. The method of claim 17, wherein the substantially equally sized components are stored non-contiguously based on a deterministic set of chaotic functions with the initial conditions as inputs.

19. The method of claim 17, wherein the set of chaotic functions is a Lorenz Attractor.

20. The method of claim 17, further comprising:
receiving a request to retrieve the file;
retrieving the initial conditions associated with the file;
identifying the current location of the file based on the initial conditions, a deterministic set of chaotic functions, and a number of relocation periods since file creation;
determining the encryption algorithm based on the set of initial conditions; and
retrieving and decrypt the file.

* * * * *